Jan. 13, 1970  J. R. LEECH ETAL  3,489,001
TENSILE TESTING APPARATUS
Filed May 9, 1968  3 Sheets-Sheet 3

INVENTORS
JOHN RODERIC LEECH AND PAUL WILLIAM
FRANK SCHOLES
BY  DAVIS, HOXIE, FAITHFULL &
HAPGOOD
ATTORNEYS

United States Patent Office 3,489,001
Patented Jan. 13, 1970

3,489,001
TENSILE TESTING APPARATUS
John Roderic Leech and Paul William F. Scholes, Coventry, England, assignors to Courtaulds Limited, London, England, a British company
Filed May 9, 1968, Ser. No. 727,766
Claims priority, application Great Britain, May 10, 1967, 21,816/67
Int. Cl. G01n 3/28, 3/08
U.S. Cl. 73—95
13 Claims

ABSTRACT OF THE DISCLOSURE

Apparatus for loading successive parts of a tape, on which is mounted a sample of filamentary material at each part, onto attachments on the relatively-movable arms of a tensile testing machine so that the sample of filamentary material is held between the arms preparatory to a tensile test, comprising a housing which is movable to and from a position in which it engages the arms of the tensile testing machine, a tape-holder mounted on the housing for holding a supply of the tape and from which the tape may be withdrawn as required, and a transfer mechanism mounted on the housing for engaging successive parts of the tape and for transferring such parts to the attachment on the arms of the tensile testing machine when the housing engages said arms.

---

Figure 1:
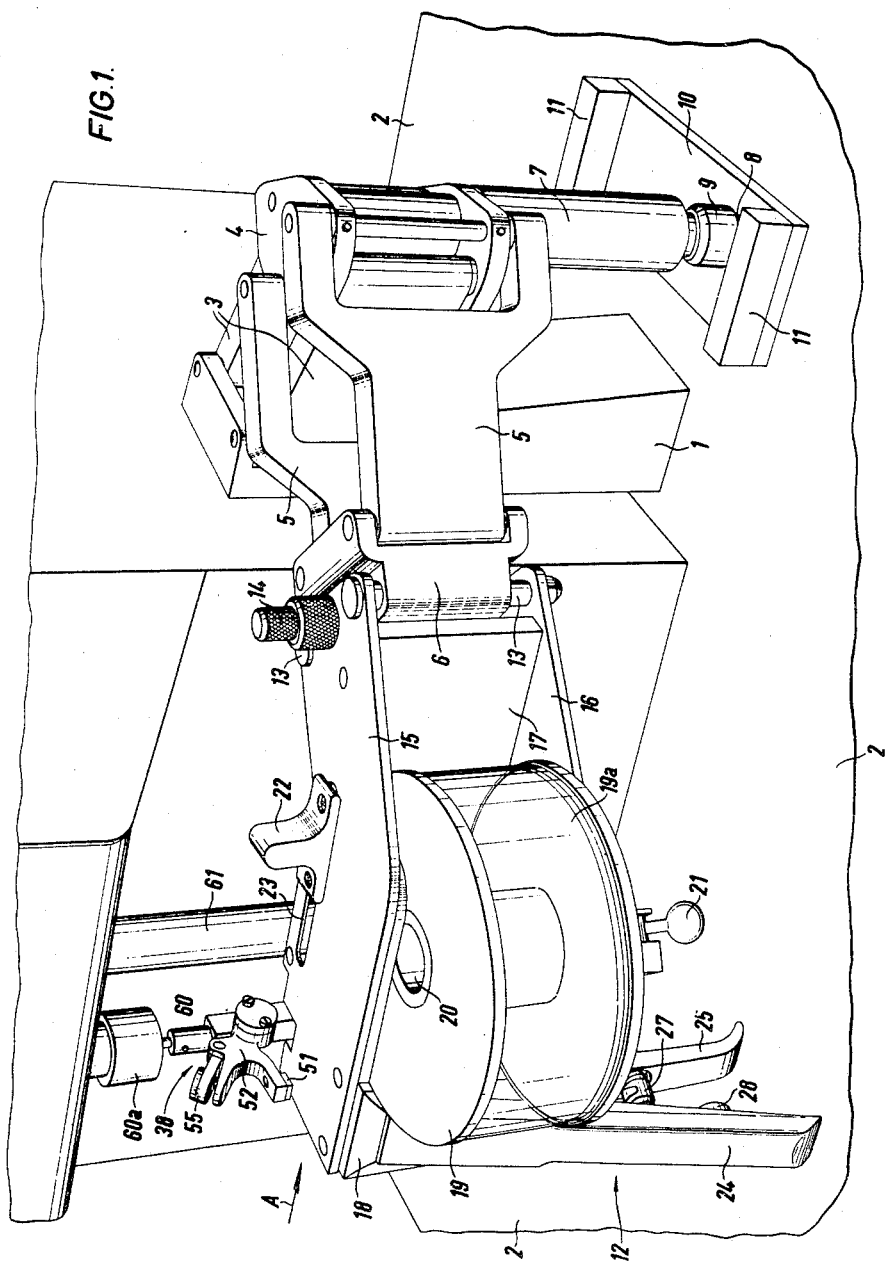

This invention relates to the determination of the tensile properties of filamentary materials, in particular textile filamentary materials including, for example, filaments, fibres, yarns and threads.

The normal method of determining the tensile properties of a sample of filamentary material is to grip a short length of the sample between two pairs of clamps and then to move the pairs of clamps apart until the sample breaks, at which time the force necessary to cause the breakage is measured together with the length of the sample in relation to its original length.

The usual method of mounting a sample of a filamentary material onto the clamps of a tensile testing apparatus is a manual operation in which one end of the sample is gripped between the jaws of a pair of clamps and then whilst a small weight is attached to the free end of the sample, it is gripped at a point above the weight between the jaws of a second pair of clamps. The weight tensions the sample sufficiently to remove from it any crimps it may have and its test length is then the separation between the clamps.

This manual procedure of clamping samples is prone to errors and often causes damage to samples, leading to their premature breakage.

The present invention relates to an apparatus for loading samples of a filamentary material onto the relatively movable arms of a tensile testing apparatus. Such an apparatus comprises means for holding a length of a tape on which at least one sample of a filamentary material is mountable, which holding means is movable to and from a position in which it is engageable with locating members on the relatively movable arms of a tensile testing apparatus, and means for transferring at least parts of the length of the tape to attachments on the relatively movable arms, when the holding means is engaged with the locating members on the arms, in such a way that a sample of filamentary material when mounted on the parts of the tape is free to be extended on relative movement of the arms.

The holding means is preferably adapted to hold a length of tape on which a plurality of samples are mountable. One form of holding means is a generally cylindrical container having a slot parallel to its axis as both the inlet and the outlet for the tape. Preferably the container is removable from the apparatus so as to be replaceable when empty by a full container. Such a container is preferably adapted to be located on an apparatus on which samples of a filamentary material can be placed and held between two sheet materials in tape form as described and illustrated in the copending application of Bernard S. Baker and William B. Poole, Ser. No. 727,402, filed May 8, 1968.

Movement of the holding means may be accomplished automatically or manually. If it is done manually it is preferred that the path of the holding means should be controlled mechanically, for example by attaching a pillar to the frame of the tensile testing apparatus and then having the holding means positioned on arms pivotally attached to the pillar so that the holding means has only a limited range of movement. This system has the advantage that damage to the loading apparatus or to the tensile testing apparatus is less likely.

The locating members on the relatively movable arms may take a variety of forms including pegs, arms and sockets. If the locating members are pegs the loading apparatus has sockets to receive the pegs, and vice-versa if the locating members are sockets. Such pegs preferably have rounded or pointed ends to aid their direction into the sockets. If the locating members are arms the loading apparatus should have hook-shaped or other members for passing over or around the arms.

The transferring means may be operated automatically or manually. If the tensile testing apparatus is such that the presence of an operator would in any case be needed, manual operation of the transferring means may be preferable. In this case movement of the holding means may also be accomplished manually. In manual operation of the transferring means we have found that operation of a piston-type lever is satisfactory.

Where the holding means is adapted to hold a length of a tape on which a plurality of samples are mountable, operation of the transferring means preferably causes a short length of the tape bearing one sample to be cut from the longer length of tape and for the cut parts to be transferred to the attachments on the relatively movable arms. If the tape is of the type shown in FIGURE 1 of the drawings accompanying the aforesaid copending patent application Ser. No. 727,402 of even date, as is preferred, operation of the transferring means preferably also effects the cutting of the transverse strips of the tape.

The attachments on the relatively movable arms for receiving the parts of the tape are preferably pegs which are adapted to be received into holes through parts of the tape. If the nature of the samples to be tested on the tensile testing apparatus warrants it, the parts of the tape may subsequently be clamped to the relatively movable arms.

The operation of the transferring means may also cause movement of members adapted to co-operate with the locating members on the relatively movable arms for securely holding and loading apparatus to the arms during transference of the parts of the tape to the attachment on the arms.

The loading apparatus may additionally include means for forwarding the tape on the holding means from a storage position, for example in the container mentioned above, to a position in which the transferring means is operable on the tape.

Figure 2:
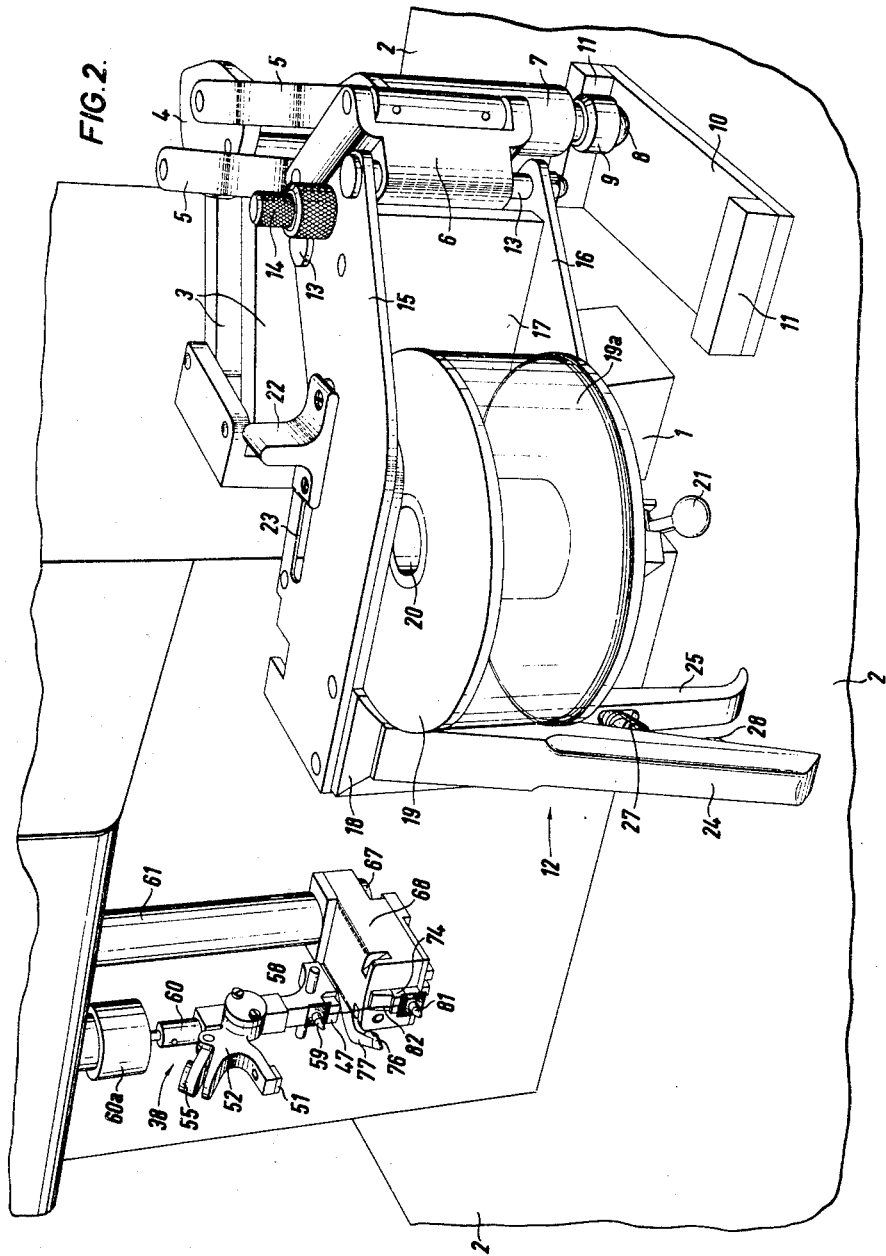
Figure 3:
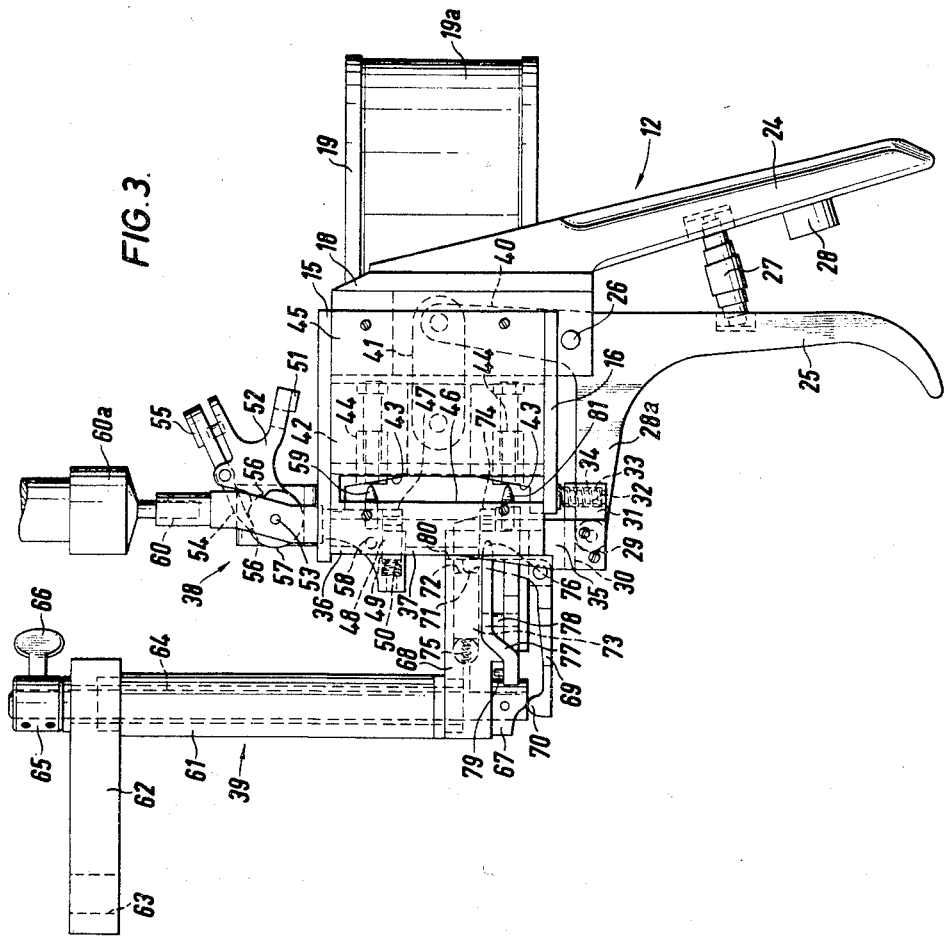

An apparatus for loading samples of a filamentary material, when mounted upon a tape of the type shown in FIGURE 1 of the drawings accompanying the aforesaid copending patent application Ser. No. 727,402 of even date, onto the relatively movable arms of a tensile testing apparatus, is illustrated, by way of example, in the accompanying drawings, in which FIGURES 1 and 2 are perspective views showing, in FIGURE 1, the apparatus in the positions where it is engaged with the relatively movable arms and, in FIGURE 2, the apparatus in its "parked" position where the movement of the arms is unrestricted to allow the extension of loaded samples, and FIGURE 3 is an elevation, from the direction of arrow A in FIGURE 1, of the apparatus and the relatively movable arms of the tensile testing apparatus.

In the drawings a pillar 1 is bolted to the working surface 2 of a tensile testing apparatus. Two arms 3 are pivotally attached at their ends to the pillar 1 and to a boss 4, to which the ends of two further arms 5 are also pivotally attached, their opposite ends being pivotally attached to a bracket 6. The pivot points of the pairs of arms 3 and 5 are all vertical and are so positioned on the pillar 1, the boss 4 and the bracket 6 that the arms in each pair are parallel. The boss 4 carries at its lower end a column 7 having a freely rotatable ball 8 in a socket 9. The ball runs over a plate 10, having end stops 11, attached to the working surface 2 so as to lighten the load on the pivot pins holding the arms 3 and 5 to the pillar, the boss 4 and the bracket 6.

The geometry of the arms 3 and 5 and the position of the plate 10 are such as to allow the bracket 6 and the parts attached to it, as described in more detail below, a limited range of movement relative to the pillar 1. In FIGURE 1 the bracket 6 is shown in a position remote from the pillar 1 whilst in FIGURE 2 the bracket is relatively close to the pillar.

A hand operated sample loader 12 is attached to the bracket 6 by two pins 13 fixed to the loader and passing through the bracket; the height of the loader relative to the bracket is adjustable by rotation of a knurled screw 14.

The hand loader 12 comprises an upper plate 15 and a lower plate 16 which are connected by a vertical wall member 17. The pins 13 pass through one pair of ends of the plates 15 and 16 and the other pair of ends are attached to a block 18 enclosing the hand-operated loading mechanism of the apparatus, described in detail below.

A cylindrical sample container 19 lies partly between the plates 15 and 16, and is held in position by a spring-loaded arm projecting through the lower plate 16 into the central bore 20 of the container and movable to allow replacement of the container when empty by a lever 21 below the lower plate. The container is adapted for being filled with a length of a ladder-like tape of the type shown in FIGURE 1 of the drawings accompanying copending patent application Ser. No. 727,402 of even date referred to above, on the apparatus described with reference to FIGURE 2 of those drawings.

A finger-piece 22 projects above the upper plate 15 and is manually slidable along a slot 23 in the plate. The finger-piece is connected to a sliding member (not seen) which is spring-biased to the position where the finger-piece is as shown. A sprung ratchet member (also not seen) on the sliding member projects into the container 19 through a gap (not seen) in its "Perspex" (trademark) outer surface 19a for engaging with any tape within the container so as to move the tape forward towards the loading mechanism on manual movement of the finger-piece 22. A further sprung ratchet member (also not seen) projects into the container through the gap mentioned above but is not connected to the sliding member. This second ratchet member is bevelled at its point of contact with any tape moved by operation of the finger-piece so as to allow the tape to ride over the ratchet member but not allow the tape to go back when the finger-piece is returned to its original position. The first finger-piece is also bevelled so as to allow the tape to ride over it when the finger piece returns to its position shown.

Attached to the block 18 is a handle 24. A trigger-type grip 25 is pivoted to the block by a pivot pin 26 so as to be manually movable towards the handle 24 against the force exerted by a coil spring 27. A stop 28 prevents excessive movement of the grip 25 towards the handle. In the region of the pivot pin 26 the grip 25 has a projecting arm 28a which carries at its free end a roller 29. The roller bears against the undersurface 30 of a saddle 31 which is spring loaded by a spring 32 around a pin 33 attached to the block 18, which pin lies in a bore 34 through the saddle, so as to tend to urge the saddle downwards when the grip 25 is urged towards the handle 24. Two sliding members 35 are attached at the sides of the saddle 31 so as to be slidably movable downwards on manual movement of the grip. On their confronting surfaces the sliding members 35 have upper and lower projections 36 and 37 which are adapted to engage parts (described below) of the upper and lower clamp arms 38 and 39, respectively, of the tensile testing apparatus.

The upper end 40 of the hand grip 25 is attached by a pivotable linkage 41 to a further sliding member 42. Above and below the point of attachment of the linkage to the sliding member are two pairs of cutting edges 43 and two bosses 44. The cutting edges are adapted to cooperate with other edges (not shown) to sever parts of the tape fed from the container 19 by movement of the finger-piece 22. The bosses 44 are adapted to be located, on movement of the grip 25, over pegs on the clamp arms 38 and 39 described below. On the end face of the loader there is a plate 45 having a vertical slot 46 therein for the removal of pieces of the tape cut off by the cutting edges 43 when other parts of the tape are loaded onto the clamp arms 38 and 39.

The upper clamp arm 38 has adjacent to its lower end a nylon face jaw 47 on a member 48 which is slidable in a horizontal socket 49 in the clamp arm and is spring loaded by a coil spring 50 so as to tend to be urged out of the socket but is restrained from complete removal from the socket by means not shown. A second nylon faced jaw 51 is mounted on a member 52 pivotally attached by a pin 53 to part of the upper clamp arm above the jaw 47. The member 52 carries a spring loaded pawl 54 having a finger-piece 55, the operative end of which is engageable in one of two notches 56, an adjustably fixed wheel 57 fixed to the clamp arm 38 at the pivot point of the member 52. The member 52 is shown in FIGURES 1 and 3 in the position it adopts when the hand loader is engaged with the clamp arms for mounting samples of filamentary materials onto the arms.

Above the socket 49 on the clamp arm 38 are two arms 58 which project from the clamp arm horizontally and perpendicular to the socket. The arms 58 are adapted to be engaged by the upper projections 36 on the sliding members 35 on movement of the hand grip 25. A tapered peg 59 also projects from the lower end of the clamp arm 38 above the jaw 47 and is adapted to be received into one of the bosses 44 on movement of the hand grip 25. A socket 60 at the upper end of the clamp arm 38 is for attachment of the clamp arm to a part 60a of a load cell (not known) for measurement of the load on the upper arm at any time.

The lower clamp arm 39 comprises a hollow pillar 61 which is attached at its upper end to a horizontal member 62 which is bored at its free end 63 for its attachment to a part on the tensile testing apparatus controlling the position of the lower clamp arm relative to the upper arm. A rod 64 is rotatably mounted in the hollow pillar 61 and carries at its upper end a boss 65 having a handle 66. At the lower end the rod 64 carries a cam 67. A generally rectangular block 68 is attached to the bottom of the pillar 61 so that the cam 67 is rotatable beneath part of the block.

A generally L-shaped lever 69 which is pivoted to the lower-surface of the block 68 has one free end 70 bearing on the lower surface of the cam 67 and its other free end 71 lies within the block 68 and contacts a groove 72 in a member 73 which is horizontally slidable within the block. One end of the member 73 outside the block 68 carries a nylon face jaw 74 and the other end is in contact with a coil spring 75 tending to urge the member 73 out of the block. In the position shown in FIGURE 3 the member 73 is fully retracted into the block but on movement of the handle 66 causing the cam 67 to rotate, the free end 70 of the lever 69 can rise up the operative surface of the cam to allow the jaw 74 to move away from the block 68 under the urge of the spring 75.

A second nylon faced jaw 76 is carried on the end of a generally hook-shaped arm 77 which is pivoted to the block 68 by a pivot pin 78. Part of the arm 77 carries a peg 79 which is slidable along a groove (not shown) in a part of the cam 67. The shape of the groove is such that when the cam is in the position shown the hook-shaped arm 77 is retracted away from the front of the block 68 so as not to impede the access of the hand loader for mounting samples onto the clamp arms 38 and 39. However, when the handle 66 is moved as mentioned above the hook-shaped arm 77 is caused to move in front of the block 68 to a position where its jaw 76 confronts the jaw 74 so that on movement of the member 73 the jaws contact each other to grip part of the tape bearing the sample.

The block 68 has on it two channels 80 which are adapted to be engaged by the lower projections 37 on the sliding members 35 on movement of the hand grip 25 when the loader is engaged with the clamp arms. The block 68 also carries a tapered peg 81 below the jaw 74 which is adapted to be received by the lower boss 44 in the sliding member 42 on movement of the hand grip 25.

To use the loading apparatus, samples of a filamentary material are mounted on tape of the type shown in FIGURE 1 of the drawing accompanying copending patent application Ser. No. 727,402 of even date referred to above, on the apparatus illustrated in FIGURE 2 of those drawings. The tape produced is loaded on the apparatus into a container 19 which is then positioned on the hand loader 12 as shown in the accompanying drawings.

With the hand loader 12 in the position shown in FIGURE 2, the finger-piece 22 is moved manually along the slot 23 so as to draw the leading end of the tape in front of the sliding member 42 and then the finger-piece 22 is released to return to the position shown in the drawings. With the clamp arms 38 and 39 separated by the appropriate distance the hand loader 12 is then moved from the position shown in FIGURE 2 to that shown in FIGURE 1 where it engages with the clamp arms. The hand grip 25 and the handle 24 are then gripped by the operator and the former is moved towards the latter so as to move the sliding members 35 downwards, causing their upper and lower projections 36 and 37 to engage the arms 58 and the channels 80, respectively, on the upper and lower clamp arms. At the same time the sliding member 42 is moved towards the upper and lower clamp arms so as to receive the tapered pegs 59 and 81 in the bosses 44. This movement causes the pegs 59 and 81 to pass through a pair of holes in the tape and the simultaneous movement of the cutting edges 43 on the sliding member 42 severs the parts of the tape surrounding the holes, which hold between them a sample of filamentary material, from the remainder of the tape.

When the hand grip 25 is allowed to revert to the position shown, the bosses 44 are withdrawn from the pegs 59 and 81 and the sliding members 35 are moved upwards so as to release the upper and lower clamp arms 38 and 39 and leave parts of the tape impaled on the tapered pegs 59 and 81 with a sample 82 between the parts of the tape, as shown in FIGURE 2. The loading apparatus may then be moved back to the position shown in FIGURE 2 whereupon determination of the tensile properties of the sample can be commenced.

If the sample to be tested is a high denier monofilament, on a yarn, the sample needs to be clamped between the paper tape and the adhesive tapes. Such clamping is accomplished on the lower clamp arm 39 by moving the handle 66 so as to bring the hook-shaped arm 77 into a position in front of the block 68 and to move the member 73 until its jaw 74 contacts the jaw 76 on the hook-shaped arm, the clamping force exerted between them being then due to the spring 75. On the upper clamp arm 38 the member 52 is pushed downwards until its jaw 51 contacts the jaw 47 and the pawl 54 engages with the lower notch 56 on the wheel 57, the clamping force being then due to the spring 50.

If desired, to reduce the risk of damage to the tensile testing apparatus a magnet can be attached to the hand loader in such a position that, when the hand loader is in the position shown in FIGURE 2 of the drawings, a proximity switch on the apparatus is made to be contacting. It can then be arranged that movement of the lower clamp arm can be effected only when the proximity switch is in the contact state. As a further safety device, to prevent damage to the apparatus when the hand loader is brought into or taken out of engagement with the clamp arms 38 and 39, a socket can be attached to a fixed part of the tensile testing apparatus behind the clamps and a peg attached to the hand loader so that the hand loader can only approach clamps from the right direction. Additionally a bracket can be attached to the wall of the tensile testing apparatus behind the upper clamp, if desired, to prevent any excess movement of the upper clamp arm, which could otherwise cause damage to the load cell, when the hand loader is brought into engagement with it.

What is claimed is:

1. Apparatus for loading successive parts of a tape, on which is mounted a sample of filamentary material at each part, onto attachments on the relatively-movable arms of a tensile testing machine so that the sample of filamentary material is held between the arms preparatory to a tensile test, comprising a housing which is movable to and from a position in which it engages the arms of the tensile testing machine, a tape-holder mounted on the housing for holding a supply of the tape and from which the tape may be withdrawn as required, and a transfer mechanism mounted on the housing for engaging successive parts of the tape and for transferring such parts to the attachment on the arms of the tensile testing machine when the housing engages said arms.

2. Apparatus as claimed in claim 1 in which the housing has locating members for engaging complementary locating members on the arms of the tensile testing machine.

3. Apparatus as claimed in claim 2 in which the locating members on the housing are movable with respect to the housing and the transfer mechanism is adapted so that when it is operated to transfer a part of the tape it also moves the locating members on the housing into engagement with the complementary locating members on the arms of the tensile testing machine.

4. Apparatus as claimed in claim 1 in which a cutter is mounted on the housing for severing successive parts of the tape from the remainder of the tape.

5. Apparatus as claimed in claim 4 in which, when the tape is a ladder-like tape having side-strips and cross-strips with successive samples of filamentary material mounted at successive positions between adjacent cross-strip and running transverse to the tape from side-strip to side-strip, the cutter is adapted to sever any cross-strips on a part of the tape which it is severing from the remainder of the tape.

6. Apparatus as claimed in claim 5 in which the transfer mechanism is adapted so that when it is operated to transfer a part of the tape it also operates the cutter.

7. Apparatus for loading successive parts of a tape, on which is mounted a sample of filamentary material at each part, onto pegs on the relatively movable arms of a tensile testing machine so that the pegs engage complementary holes in the part of the tape and the sample of filamentary material is held between the arms preparatory to a tensile test, comprising a housing which is movable to and from a position in which it engages the arms of the tensile testing machine, a tape-holder mounted on the housing for holding a supply of tape and from which the tape may be withdrawn as required, spring-loaded bosses slidably mounted in the housing, the free ends of the bosses having cavities therein complementary to the pegs on the arms of the tensile testing machine, and means for sliding the bosses outwardly from the housing against their spring-loading so that the bosses in sliding out engage their cavities over the pegs and in so doing push a part of the tape which has its complementary holes aligned with the pegs onto the pegs.

8. Apparatus as claimed in claim 7 in which the means for sliding the bosses outwardly from the housing comprises a hand-lever pivotally mounted on the housing.

9. Apparatus as claimed in claim 7 including a device for withdrawing the tape from the tape-holder, the device comprising a hand-operated ratchet which engages holes in the tape and movement of which withdraws the tape from the tape holder.

10. Apparatus as claimed in claim 9 in which the tape-holder comprises a removable cassette.

11. Apparatus for loading successive parts of a tape, on which is mounted a sample of filamentary material at each part, onto attachments on the relatively-movable arms of a tensile testing machine so that the sample of filamentary material is held between the arms preparatory to a tensile test, comprising a housing which is movable to and from a position in which it engages the arms of the tensile testing machine, a tape-holder mounted on the housing for holding a supply of the tape and from which the tape may be withdrawn as required, and a transfer mechanism mounted on the housing for engaging successive parts of the tape and for transferring such parts to the attachment on the arms of the tensile testing machine when the housing engages said arms, and in combination with the apparatus, a tensile testing machine having relatively-movable arms and attachments on the arms onto which the apparatus can load successive parts of the tape.

12. Tape-loading apparatus in combination with a tensile testing machine as claimed in claim 11 in which the attachments on the arms of the tensile testing machine comprise pegs which are to fit into complementary holes in a part of the tape.

13. Tape-loading apparatus in combination with a tensile testing machine as claimed in claim 11 in which the tensile testing machine has on each arm a clamp for clamping a part of the tape after that part has been loaded onto the attachments on the arms.

References Cited

UNITED STATES PATENTS 2,056,560   10/1936   Boden _____ 221—74

JERRY W. MYRACLE, Primary Examiner

U.S. Cl. X.R.

221—188